(12) United States Patent
Kuramoto et al.

(10) Patent No.: US 7,901,784 B2
(45) Date of Patent: *Mar. 8, 2011

(54) OPTICAL WAVEGUIDE, OPTICAL TRANSMITTER AND RECEIVER MODULE, AND LAMINATED STRUCTURE

(75) Inventors: Keiichi Kuramoto, Kadoma (JP); Hiroaki Izu, Hirakata (JP); Mitsuaki Matsumoto, Osaka (JP); Koji Yamano, Hirakata (JP); Hitoshi Hirano, Nishinomiya (JP); Youhei Nakagawa, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 359 days.

This patent is subject to a terminal disclaimer.

(21) Appl. No.: 11/505,331

(22) Filed: Aug. 17, 2006

(65) Prior Publication Data

US 2006/0275615 A1 Dec. 7, 2006

Related U.S. Application Data

(63) Continuation of application No. 10/452,316, filed on Jun. 3, 2003, now abandoned.

(30) Foreign Application Priority Data

Jun. 7, 2002 (JP) .................................. 2002-167472
Feb. 27, 2003 (JP) .................................. 2003-50340

(51) Int. Cl.
*B32B 9/04* (2006.01)
(52) U.S. Cl. ....................................................... 428/447
(58) Field of Classification Search .................... 428/447
See application file for complete search history.

(56) References Cited

U.S. PATENT DOCUMENTS

| 5,991,493 A | 11/1999 | Dawes et al. | ................. 385/141 |
| 6,144,795 A | 11/2000 | Dawes et al. | ................. 385/141 |
| 6,228,796 B1 * | 5/2001 | Arakawa et al. | .............. 502/159 |

FOREIGN PATENT DOCUMENTS

| CN | 1261157 A | 7/2000 |
| CN | 1304052 A | 7/2001 |
| CN | 1331729 A | 1/2002 |
| JP | 4-86707 A | 3/1992 |
| JP | 6-67230 A | 3/1994 |
| JP | 7-331173 A | 12/1995 |
| JP | 10-101717 A | 4/1998 |
| JP | HEI-10-306109 A1 | 11/1998 |
| JP | 11-174247 A | 7/1999 |
| JP | 2000-066051 A1 | 3/2000 |
| JP | 2000-230052 A1 | 8/2000 |
| JP | 2000-241640 A | 9/2000 |
| JP | 2000-356722 A | 12/2000 |
| JP | 2001-059918 A1 | 3/2001 |
| JP | 2001-337243 A | 12/2001 |
| JP | 2003-172802 A | 6/2003 |

* cited by examiner

*Primary Examiner* — Margaret G Moore
(74) *Attorney, Agent, or Firm* — Kubovcik & Kubovcik

(57) ABSTRACT

An optical waveguide in which a groove is formed on the top surface of a substrate used as a lower clad and a core is formed in the groove, characterized in that the core is formed in such a way that the top face of the core within the groove is at a lower level than the top face of the substrate, and an upper clad may also be provided on the core, and the core is preferably formed from an organic-inorganic hybrid material.

14 Claims, 10 Drawing Sheets

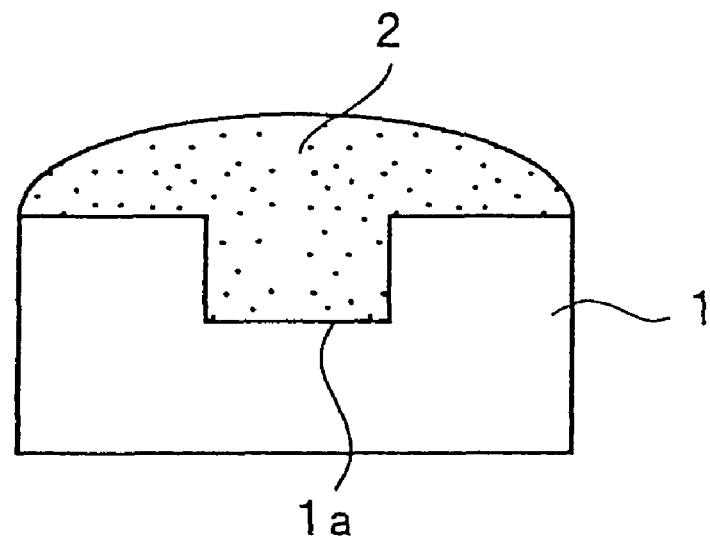
FIG. 15 ( a )
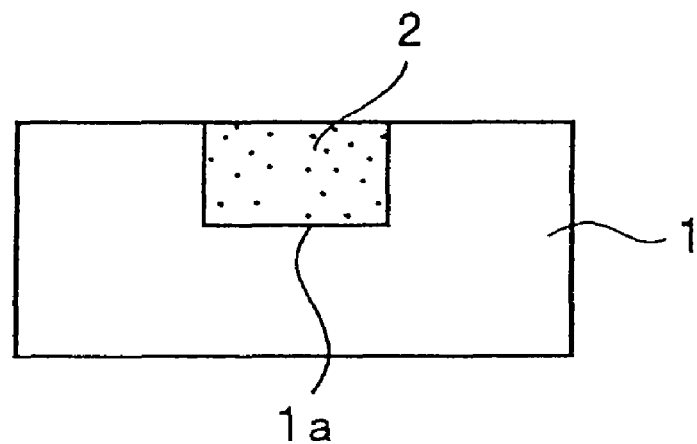
FIG. 15 ( b )
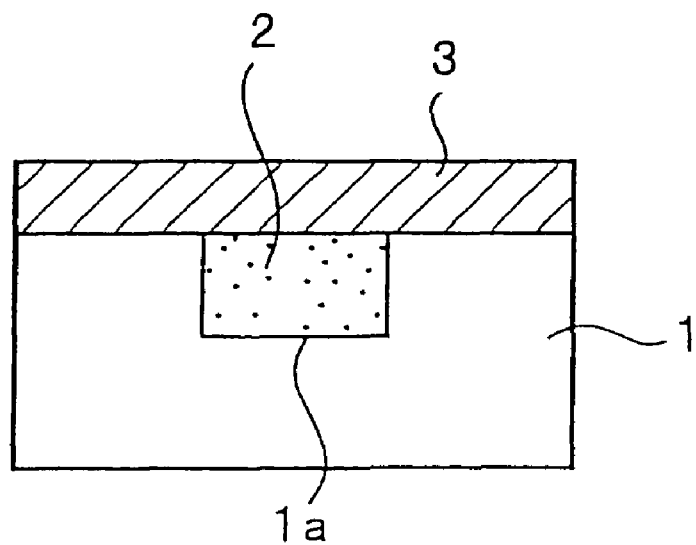
FIG. 15 ( c )

US 7,901,784 B2

OPTICAL WAVEGUIDE, OPTICAL TRANSMITTER AND RECEIVER MODULE, AND LAMINATED STRUCTURE

This application is a continuation of U.S. patent application Ser. No. 10/452,316 filed Jun. 3, 2003, abandoned, which claims priority based on Japanese Patent Application Nos. 2002-167472 and 2003-50340 filed Jun. 7, 2002, and Feb. 27, 2003, respectively, which are incorporated herein by reference.

BACKGROUND OF THE INVENTION

1. Field of the Invention

The present invention relates to a laminated structure consisting of a novel organic-inorganic hybrid material and an optical waveguide, which are useful for a board for electrical wiring, materials for mechanical parts, an antireflection coating, various coating materials like a surface protection coating, an optical communication device such as an optical transmitter and receiver module and an optical switch, optical devices having a structure of an optical transmission line such as an optical waveguide and an optical fiber, eyeglasses, an optical lens, an optical filter, a diffraction grating, a light guiding plate, an interferometer, an optical coupler, an optical coupler/branching filter, an optical sensor, a holographic optical element, another materials for optical parts, a photovoltaic device, a contact lens and a medical artificial tissue.

2. Related Art

In electronic components, optical components or elements thereof, there are occasions when a laminated structure formed by laminating layers, each of which is formed from a different material in properties, formed from at least two materials is used. For example, in an optical waveguide which has a function to confine and propagate optical energy, the laminated structure is prepared by laminating two or more layers, each of which is formed from a material having a different refractive index.

The optical waveguides are used in a wide variety of optical system devices of optical integrated circuits, optical fiber communication and the like. As the material of the optical waveguide, organic-inorganic hybrid materials having high optical transparency are studied.

In Japanese Patent Laid-Open No. 356722(2000), there is disclosed a method in which a groove is formed in a quartz substrate, a sol-gel solution of an organic-inorganic hybrid material is impregnated into the groove, and then the sol-gel solution is cured by ultraviolet irradiation to form a core.

FIG. 15 is a sectional view showing an example of the method in which a groove is formed in a substrate and an organic-inorganic hybrid material is impregnated into this groove to form a core.

As shown in FIG. 15(a), the organic-inorganic hybrid material 2 is filled so as to bury the inside of a groove 1a of a substrate 1 in which the groove 1a is formed. Next, after the organic-inorganic hybrid material 2 is heated to be dried, an excessive organic-inorganic hybrid material 2 is eliminated along a top surface of the substrate 1 as shown in FIG. 15 (b). Then, as shown in FIG. 15(c), an upper clad layer 3 is provided on the core layer 2 and the substrate 1 to complete the optical waveguide.

However, there was a problem that in eliminating the excessive organic-inorganic hybrid material 2 by lapping, flaws due to lapping remain on the top surface of the core layer 2, and when light is propagated within the core 2, the propagated light is scattered due to the flaws and propagation losses of light is generated.

SUMMARY OF THE INVENTION

It is the first object of the present invention to provide an optical waveguide which can reduce propagation losses of light due to propagated light scattering.

It is the second object of the present invention to provide an optical waveguide having a novel structure which uses an organic-inorganic hybrid material for a core layer.

It is the third object of the present invention to provide a laminated structure consisting of an organic-inorganic hybrid material, which has high adhesion.

An optical waveguide according to the first aspect of the present invention is characterized in that in the optical waveguide in which a groove is formed on the top surface of a substrate used as a lower clad and a core is formed in the groove, the core is formed in such a way that the top face of the core within the groove is at a lower level than the top face of the substrate.

In accordance with the first aspect of the present invention, the core is formed in such a way that the top face of the core is at a lower level than the top face of the substrate in the groove of the core. Thus, it is not necessary to remove the top face of the core by lapping or the like and flaws due to lapping are not generated on the top surface of the core. Therefore, propagation losses of light due to scattering of the propagated light can be reduced.

In the first aspect of the present invention, on the core, the upper clad may also be provided. The upper clad may be provided only in the groove or may also be provided around the groove.

In the first aspect of the present invention, the core is preferably formed from the organic-inorganic hybrid material or resin. Further, the upper clad is preferably formed from the organic-inorganic hybrid material or resin.

Further, the substrate is preferably formed from glass, silicon, ceramic, organic-inorganic hybrid material, or resin.

In the first aspect of the present invention, the substrate is provided with a groove, and this groove may be formed by forming the substrate from a material to be softened by heating and by pressing a mold against the substrate formed from the material in a condition of being heated and softened.

In the present invention, an organic-inorganic hybrid material may be formed from an organic polymer and metal alkoxide or from at least one kind of metal alkoxide. As the metal alkoxide, there are given alkoxides of Si, Ti, Zr, Al, Sn, Zn and the like. Particularly, alkoxides of Si, Ti, or Zr is preferably used. Accordingly, alkoxysilane, titanium alkoxide and zirconium alkoxide are preferably used, and particularly, alkoxysilane is preferably used. As the alkoxysilane, there are given tetraethoxysilane, tetramethoxysilane, tetra-n-propoxysilane, tetraisopropoxysilane, tetra-n-butoxysilane, tetraisobutoxysilane, and phenyltriethoxysilane. As the titanium alkoxide, there are given titanium isopropoxide, titaniumbutoxide and the like. As the zirconiumalkoxide, there are given zirconium isopropoxide, zirconium butoxide and the like.

Though the above-mentioned substance can be used as the metal alkoxide, it is generally possible to use the metal alkoxide expressed by M (OR) n, wherein M is metal, R is an alkyl group and n is 2, 3, 4 or 5, or R'M(OR)$_{n-1}$, wherein M is metal, R is an alkyl group, R' is an organic group and n is 2, 3, 4 or 5, or R'$_2$M (OR)$_{n-2}$, wherein M is metal, R is an alkyl group, R' is an organic group and n is 2, 3, 4 or 5. As the metal M, there are given alkoxides of Si, Ti, Zr, Al, Sn, Zn and the like as described above. As the alkyl group R, there are given the alkyl group having 1 to 5 carbon atoms. As the organic group R', there are given, for example, an alkyl group, an aryl-containing group, an acryloxy-containing group, a methacryloxy-containing group, a styryl-containing group, and an epoxy-containing group. Incidentally, the aryl-containing group means the organic group containing an aryl group, the acryloxy-containing group means the organic group containing an acryloxy group, the methacryloxy-containing group the organic group containing a methacryloxy group, the styryl-containing group the organic group containing a styryl group, and the epoxy-containing group the organic group containing an epoxy group. When metal M is tetravalent, it is possible to use the metal alkoxide expressed by $M(OR)_4$, wherein M is metal and R is an alkyl group, or $R'M(OR)_3$, wherein M is metal, R is an alkyl group and R' is an alkyl group, an aryl-containing group, an acryloxy-containing group, a methacryloxy-containing group, a styryl-containing group or an epoxy-containing group, or $R'_2M(OR)_2$, wherein M is metal, R is an alkyl group and R' is an alkyl group, an aryl-containing group, an acryloxy-containing group, a methacryloxy-containing group, a styryl-containing group or an epoxy-containing group. As the particularly preferable metal alkoxide used, there are given tetraethoxysilane, tetramethoxysilane, phenyltriethoxysilane, phenyltrimethoxysilane, diphenyldiethoxysilane, diphenyldimethoxysilane, 3-methacryloxy propyl triethoxysilane, 3-methacryloxy propyl trimethoxysilane, 3-methacryloxy propyl methyldimethoxysilane, and 3-acryloxy propyl trimethoxysilane. The metal alkoxides in the present invention include also the so-called organoalkoxysilane and silane coupling agent.

The organic polymer is not specifically limited as long as it can form metal alkoxide and organic-inorganic hybrid material. As the organic polymer, for example, a polymer having a carbonyl group, a polymer having a benzene ring and a polymer having a naphthalene ring can be given. As the specific example of the organic polymer, there are given, for example, polyvinyl pyrrolidone, polycarbonate, polymethylmethacrylate, polyamide, polyimide, polystyrene, polyethylene, polypropylene, epoxy resin, phenolic resin, acrylic resin, urea resin, melamine resin and the like. Polyvinylpyrrolidone, polycarbonate, polymethyl methacrylate, polystyrene, or the mixture thereof is preferably used as the organic polymer from the viewpoint of forming the organic-inorganic hybrid material having high optical transparency.

Further, products of hydrolysis and polycondensation of 3-methacryloxy propyl ethoxysilane, products of hydrolysis and polycondensation of 3-methacryloxy propyl trimethoxysilane, products of hydrolysis and polycondensation of p-styryltriethoxysilane, and products of hydrolysis and polycondensation of p-styryltrimethoxysilane are also preferably employed as the organic polymer. When the above-mentioned organic-inorganic hybrid materials are formed by sol-gel process using these organic polymers, alcohols such as methanol, ethanol, isopropanol, and butanol can be used as a solvent.

On the other hand, when resins such as polymethyl methacrylate, polystyrene, and polyvinyl naphthalene are used as the organic polymer, a solvent such as N-methyl-2-pyrrolidone, dimethylformamide and the like is generally used.

In the first aspect of the present invention, when two layers contacting with each other among the substrate, the core, the lower clad and the upper clad are formed from the organic-inorganic hybrid materials, preferably, one of the organic polymer and the metal alkoxide is commonly used in the respective organic-inorganic hybrid materials composing the two layers contacting with each other. When one of the organic polymer or the metal alkoxide is commonly used between the contacting layers, the adhesion between the organic-inorganic hybrid materials is enhanced and therefore the occurrence of delamination between the organic-inorganic hybrid material scan be suppressed.

And, with respect to the organic-inorganic hybrid materials composing the above-mentioned two contacting layers, the organic-inorganic hybrid material composing the upper layer thereof is preferably formed using a raw material and/or a solvent, which resists dissolving the organic-inorganic hybrid material composing the lower layer thereof. For example, when the organic-inorganic hybrid material composing the upper layer is composed of any one material of the material synthesized using alcohol as a solvent and the material synthesized using N-methyl-2-pyrrolidone as a solvent, the organic-inorganic hybrid material composing the lower layer is preferably composed of the other material of the materials synthesized.

As the material synthesized using alcohol as a solvent, there are given the organic-inorganic hybrid materials using the above-mentioned products of hydrolysis and polycondensation of 3-methacryloxy propyl ethoxysilane as the organic polymer. These organic-inorganic hybrid materials have high resistance to various solvents such as N-methyl-2-pyrrolidone and dimethyl formaldehyde after being dried and cured. Therefore, when these organic-inorganic hybrid material is used to the lower layer, even if the organic-inorganic hybrid material synthesized using N-methyl-2-pyrrolidone or the like as a solvent is formed thereon, the lower layer becomes resistant to be dissolved by the solvent used to form the organic-inorganic hybrid material.

And, as the material synthesized using N-methyl-2-pyrrolidone as the solvent, there are given the organic-inorganic hybrid materials using resins such as polymethyl methacrylate, polystyrene, and polyvinyl naphthalene as the organic polymer. These organic-inorganic hybrid materials are not dissolved in alcohol. Therefore, when these organic-inorganic hybrid material is formed as the lower layer, even if the organic-inorganic hybrid material synthesized using alcohol as a solvent is formed as the upper layer, the lower layer is resistant to be dissolved by the solvent.

In the first aspect of the present invention, when one layer of two layers contacting with each other among the substrate, the core, the lower clad and the upper clad is formed from the organic-inorganic hybrid material, preferably, the other layer of the two contacting layers consists of a resin layer containing the same kind of an organic component as an organic component composing the organic-inorganic hybrid material of the one layer or inorganic matter containing the metal component of metal alkoxide composing the organic-inorganic hybrid material of the one layer. This allows the adhesion between the two layers to enhance and the occurrence of cracks to be suppressed.

For example, when the one layer is an acrylic organic polymer such as polymethyl methacrylate, products of hydrolysis and polycondensation of 3-methacryloxy propyl ethoxysilane, and products of hydrolysis and polycondensation of 3-methacryloxy propyl methoxysilane, the other layer is preferably formed from an acrylic resin (acrylic thermoplastic resins, thermosetting resins or ultraviolet curable resins) or the like.

Further, when the metal alkoxide composing the organic-inorganic hybrid material of the one layer is metal alkoxide containing silicon, the other layer is preferably composed of silicon oxide or silicon nitride, which is an inorganic matter of silicon.

The optical waveguide according to the second aspect of the present invention is characterized in that the optical waveguide includes a substrate, a lower clad layer provided on the substrate and a core layer provided on the lower clad layer, and the core layer is formed from the organic-inorganic hybrid material.

In the second aspect of the present invention, the core layer is formed so as to have a thickness of greater than a peripheral thickness. In such a core layer, a portion of the core layer having a greater thickness can be formed by pressing a mold provided with a recessed portion corresponding to the core layer to be formed against the organic-inorganic hybrid material with the organic-inorganic hybrid material heated and softened to form a projection portion corresponding to the recessed portion in the organic-inorganic hybrid material.

In the second aspect of the present invention, the lower clad layer may be formed from the organic-inorganic hybrid material, resin, or silicon oxide.

In the second aspect of the present invention, on the core layer, the upper clad layer may be provided. The upper clad layer may be formed, for example, from the organic-inorganic hybrid material or resin.

Also in the second aspect of the present invention as is the case with the first aspect, when two layers contacting with each other among the substrate, the core, the lower clad layer and the upper clad layer are formed from the organic-inorganic hybrid materials, preferably, one of the organic polymer and the metal alkoxide is commonly used in the respective organic-inorganic hybrid materials composing the two contacting layers.

Further, with respect to the organic-inorganic hybrid materials composing the two contacting layers, the organic-inorganic hybrid material composing the upper layer thereof is preferably formed using a raw material and/or a solvent, which resists dissolving the organic-inorganic hybrid material composing the lower layer thereof.

And, preferably, the organic-inorganic hybrid material composing the upper layer is composed of any one material of the material synthesized using alcohol as a solvent and the material synthesized using N-methyl-2-pyrrolidone as a solvent and the organic-inorganic hybrid material composing the lower layer is composed of the other material of the materials synthesized.

Further, when one layer of two layers contacting with each other among the substrate, the core, the lower clad layer and the upper clad layer is formed from the organic-inorganic hybrid material, preferably, the other layer of the two contacting layers consists of a resin layer containing the same kind of an organic component as an organic component composing the organic-inorganic hybrid material of the one layer or inorganic matter containing the metal component of metal alkoxide composing the organic-inorganic hybrid material of the one layer.

As described above, the organic-inorganic hybrid material in the first and second aspects of the present invention may also be formed from at least one kind of metal alkoxide. That is, the organic-inorganic hybrid material may be formed from only metal alkoxide without using the organic polymer. In this case, the organic-inorganic hybrid material may be formed from one kind of metal alkoxide, or two or more kinds of metal alkoxides. When the organic-inorganic hybrid material is formed from two or more kinds of metal alkoxides, it is preferably formed from the metal alkoxide having a double bond group to be polymerized by light or heat and from the metal alkoxide not having the double bond group. As the double bond group to be polymerized by light or heat, an acryloxy group, a methacryloxy group and a styryl group can be given.

Preferably, the metal alkoxide having a double bond group polymerizes through a reaction of the double bond. When the double bond group is the acryloxy group or the methacryloxy group, preferably, the acryloxy group or the methacryloxy group reacts and polymerizes in such a way that in infrared absorption spectrum, the value of (height of the absorption peak resulting from a C=C bond in the neighborhood of 1650 $cm^{-1}$)/(height of the absorption peak resulting from a C=O bond in the neighborhood of 1750 $cm^{-1}$) is 0.1 or less. Preferably, the organic-inorganic hybrid material does not contain a photopolymerization initiator, which is used to promote the photopolymerization, from the viewpoint of not degrading optical transmittance of the organic-inorganic hybrid material.

In the first and second aspects of the present invention, when two layers contacting with each other among the substrate, the core, the lower clad and the upper clad are formed from organic-inorganic hybrid materials, preferably, at least one kind of metal alkoxide is commonly used in the respective organic-inorganic hybrid materials composing the two contacting layers. Particularly, when at least one layer of organic-inorganic hybrid materials composing the two contacting layers is formed from only at least one kind of metal alkoxide, the metal alkoxide is commonly used in the two contacting layers. This allows the adhesion between the two layers to enhance and the occurrence of cracks to be suppressed.

In the first and second aspects of the present invention, when two layers contacting with each other among the substrate, the core, the lower clad and the upper clad are formed from organic-inorganic hybrid materials, one layer of the two contacting layers may be composed of the organic-inorganic hybrid material formed from the organic polymer and metal alkoxide, and the other layer of the two contacting layers may be composed of the organic-inorganic hybrid material formed from the organic polymer and metal alkoxide or from at least one kind of metal alkoxide.

When the organic polymer in the one layer is an acrylic resin, the metal alkoxide in the other layer is preferably metal alkoxide having an acryloxy group or a methacryloxy group. Since the acrylic resin has an affinity for the acryloxy group or the methacryloxy group, it is possible to enhance the adhesion between the two layers and therefore to suppress the occurrence of cracks by employing such a constitution. And, preferably, the metal alkoxide polymerizes through a reaction of the acryloxy group or the methacryloxy group.

When the organic polymer in the one layer is a styrene resin, the metal alkoxide in the other layer is preferably metal alkoxide having a benzene ring. Since the styrene resin has an affinity for the benzene ring, it is possible to enhance the adhesion between the two layers and therefore to suppress the occurrence of cracks by employing such a constitution.

When the organic polymer in the one layer is an epoxy resin, the metal alkoxide in the other layer is preferably metal alkoxide having an epoxy group. Since the epoxy resin has an affinity for an epoxy group, it is possible to enhance the adhesion between the two layers and therefore to suppress the occurrence of cracks by employing such a constitution.

An optical transmitter and receiver module of the present invention is characterized in that the optical waveguide of the above-mentioned first aspect and the above-mentioned second aspect of the present invention are used.

A laminated structure according to the third aspect of the present invention is a laminated structure in which one organic-inorganic hybrid material is laminated on another organic-inorganic hybrid material and is characterized in that either of the organic polymer or the metal alkoxide is commonly used among the different organic-inorganic hybrid materials laminated.

In accordance with the third aspect of the present invention, since one of the organic polymer or the metal alkoxide is commonly used among the different organic-inorganic hybrid materials laminated, the adhesion between the organic-inorganic hybrid materials is high and therefore the occurrence of delamination between the different organic-inorganic hybrid materials can be suppressed.

In the laminated structure according to the third aspect of the present invention, the organic-inorganic hybrid materials may be formed from only metal alkoxide as is the case with the first and second aspects. Accordingly, when one layer of the organic-inorganic hybrid material layers is formed from at least one kind of metal alkoxide and the other layer of the organic-inorganic hybrid material layers is formed from at least one kind of metal alkoxide or from an organic polymer and metal alkoxide, preferably, at least one kind of metal alkoxide is commonly used among the organic-inorganic hybrid materials laminated.

Further, when one layer of the organic-inorganic hybrid material layers is formed from the organic polymer and the metal alkoxide, and the other layer of the organic-inorganic hybrid material layers is formed from the organic polymer and the metal alkoxide or from at least one kind of metal alkoxide, it is possible to employ the combination of the organic-inorganic hybrid materials as is the case with the first and the second aspects of the present invention. That is, when the organic polymer in the one layer is an acrylic resin, the metal alkoxide in the other layer is preferably metal alkoxide having an acryloxy group or a methacryloxy group. Preferably, the metal alkoxide polymerizes through a reaction of the acryloxy group or the methacryloxy group. And, when the organic polymer in the one layer is a styrene resin, the metal alkoxide in the other layer is preferably metal alkoxide having a benzene ring. And, when the organic polymer in the one layer is an epoxy resin, the metal alkoxide in the other layer is preferably metal alkoxide having an epoxy group.

By utilizing the organic polymer in the one layer and the metal alkoxide in the other layer in combination as described above, it is possible to improve the adhesion of the organic-inorganic hybrid materials and therefore to suppress the occurrence of delamination between the organic-inorganic hybrid materials.

As the organic-inorganic hybrid materials used in the third aspect of the present invention, the organic-inorganic hybrid materials used in the first and the second aspects can be given.

Also in the third aspect of the present invention as is the case with the first and second aspects, the organic-inorganic hybrid material composing the upper layer of the organic-inorganic hybrid materials composing the laminated structure is preferably formed using a raw material and/or a solvent, which resists dissolving the organic-inorganic hybrid material composing the lower layer of the organic-inorganic hybrid materials composing the laminated structure.

And, preferably, the organic-inorganic hybrid material composing the upper layer is composed of any one material of the material synthesized using alcohol as a solvent and the material synthesized using N-methyl-2-pyrrolidone as a solvent and the organic-inorganic hybrid material composing the lower layer is composed of the other material of the materials synthesized.

In the first aspect, the second aspect and the third aspect of the present invention, when the two layers contacting with each other are formed from organic-inorganic hybrid materials and metal alkoxide having a double bond group to be polymerized by light or heat is used in an upper layer of the two contacting layers, the metal alkoxide may polymerizes through a reaction of the double bond group by light irradiation. Particularly, when a substratum layer became deformed by heat in heating the upper layer to be polymerized, it is preferred to polymerize the upper layer to be cured by light irradiation as described above.

In the first aspect, the second aspect and the third aspect of the present invention, by changing a combination and a blending ratio of the organic polymer and the metal alkoxide, which are used in the organic-inorganic hybrid material, a refractive index of the resulting organic-inorganic hybrid material can be adjusted.

FIG. 2 is a view showing refractive indexes of the organic-inorganic hybrid materials when polyvinyl naphthalene, polystyrene and acrylic resin are used as the organic polymer, and diphenyldiethoxysilane, phenyltriethoxysilane and tetraethoxysilane are used as the metal alkoxide. In FIG. 2, there are shown changes in the refractive index in a combination of polyvinyl naphthalene and diphenyldiethoxysilane, polystyrene and diphenyldiethoxysilane, polystyrene and phenyltriethoxysilane, acrylic resin and phenyltriethoxysilane, and acrylic resin and tetraethoxysilane, respectively. It is understood that the organic-inorganic hybrid materials having various refractive indexes can be formed by changing a combination of kinds of the organic polymer and the metal alkoxide and their blending ratios as shown in FIG. 2.

As described above, the refractive index can be enhanced by introducing the benzene ring, the naphthalene ring and the like into the organic-inorganic hybrid material, and the refractive index of the organic-inorganic hybrid material can be enhanced by introducing a double bond and a triple bond of carbon, and metal atoms such as S (sulfur), Cl (chlorine), Mo, Mn, Sn, Ti, Zr and the like.

BRIEF DESCRIPTION OF THE DRAWINGS

FIG. 15 is a sectional view showing a fabrication process of a conventional optical waveguide.

DESCRIPTION OF THE PREFERRED EXAMPLES

Hereinafter, the present invention will be described in detail by way of examples, but the present invention is not limited by these examples.

Examples 1 to 5

Figure 1:
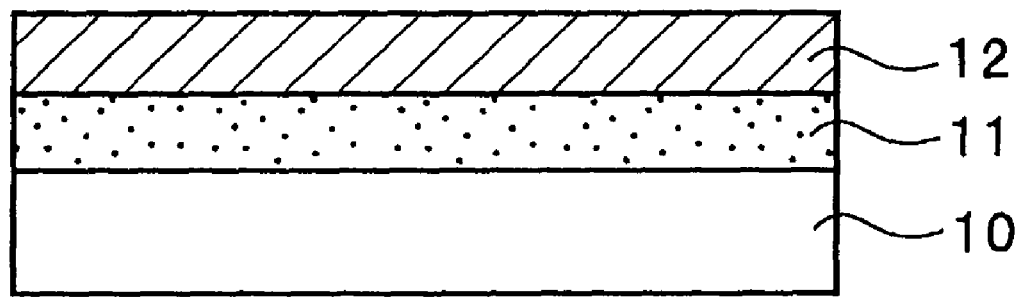
FIG. 1 is a sectional view showing a laminated structure of an example according to the third aspect of the present invention.
Figure 2:
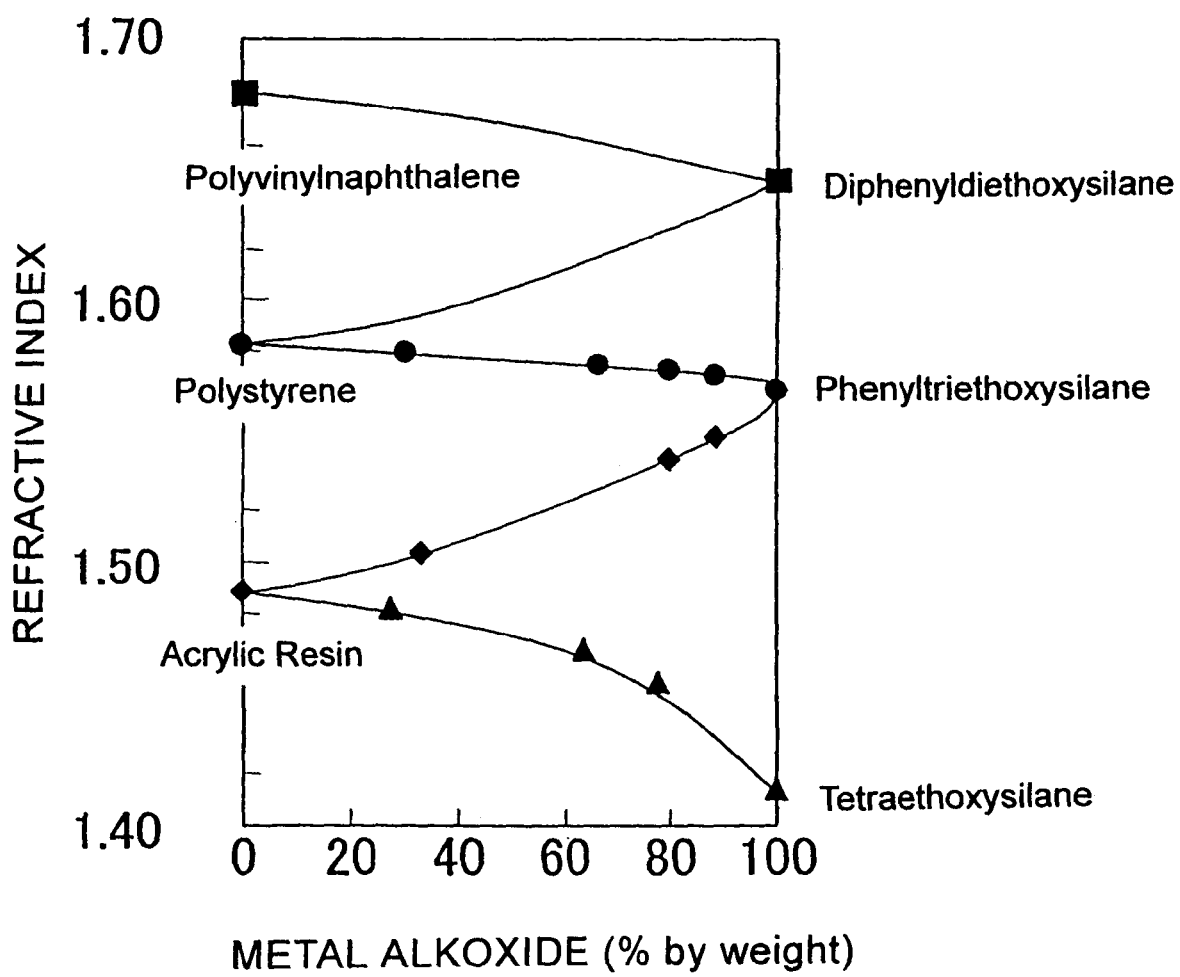
FIG. 2 is a view showing a relationship between a refractive index of the organic-inorganic hybrid material in the present invention and a refractive index of an organic polymer and metal alkoxide.

FIG. 1 is a sectional view showing an example of a laminated structure according to the third aspect of the present invention. An organic-inorganic hybrid material layer 11 is provided on a substrate 10 and an organic-inorganic hybrid material layer 12 is laminated on the organic-inorganic hybrid material layer 11. Though the organic-inorganic hybrid material layer 11 and the organic-inorganic hybrid material layer 12 are formed from different organic-inorganic hybrid materials, respectively, either of an organic polymer and metal alkoxide is commonly used in the respective organic-inorganic hybrid materials 11 and 12.

Hereinafter, the example of the laminated structure according to the third aspect of the present invention will be described. In the following examples, the organic-inorganic hybrid materials were prepared by a sol-gel process. The solutions of the metal alkoxide and the organic polymer used to the sol-gel process were prepared in the following way.

Solution of metal alkoxide: Water and 1N hydrochloric acid were added to the metal alkoxide in such a way that water was 2 mol and hydrochloric acid was 0.0018 mol for 1 mol of the metal alkoxide, and a 1.35-fold weight of solvent was used for the metal alkoxide to form the solution of the metal alkoxide.

Solution of organic polymer: a 4.7-fold weight of solvent was used for the organic polymer to form the solution of the organic polymer.

The prepared metal alkoxide solution was let alone for 19 hours, hydrolyzed and polycondensated, and then the metal alkoxide solution and the organic polymer solution were blended in a predetermined rate (blending ratio expressed by weight ratio) and mixed for 30 minutes. Then, the mixture was applied to a subject and dried to form the organic-inorganic hybrid material. Drying was conducted at 120° C. for 5 hours.

In the following examples and comparative examples, a silicon substrate was used as a substrate, and an organic-inorganic hybrid material layer 11 was formed from the hybrid material P and an organic-inorganic hybrid material layer 12 was formed from the hybrid material Q.

Example 1

Hybrid Material P
Metal alkoxide: tetraethoxysilane (TEOS)
Organic polymer: acrylic resin (polymethyl methacrylate: PMMA)
Formulation ratio of metal alkoxide solution and organic polymer solution=1:1.3
Hybrid Material Q
Metal alkoxide: phenyltriethoxysilane
Organic polymer: acrylic resin (PMMA)
Formulation ratio of metal alkoxide solution and organic polymer solution=1:0.57
Solvent
N-methyl-2-pyrrolidone (NMP)
The solution of the hybrid material P was applied to the surface of a substrate by a spin coating technique and dried, and then the solution of the hybrid material Q was applied to the resulting coating by a spin coating technique and dried to form two organic-inorganic hybrid material layers of 5 μm in thickness, respectively.

Comparative Example 1

Hybrid Material P
Metal alkoxide: tetraethoxysilane (TEOS)
Organic polymer: acrylic resin (PMMA)
Formulation ratio of metal alkoxide solution and organic polymer solution=1:6.1
Hybrid Material Q
Metal alkoxide: phenyltriethoxysilane
Organic polymer: polystyrene (PS)
Formulation ratio of metal alkoxide solution and organic polymer solution=1:5.3
Solvent
N-methyl-2-pyrrolidone (NMP)
The solution of the hybrid material P was applied to the surface of a substrate by a spin coating technique and dried, and then the solution of the hybrid material Q was applied to the resulting coating by a spin coating technique and dried to form two organic-inorganic hybrid material layers of 5 μm in thickness, respectively.

Example 2

Hybrid Material P
Metal alkoxide: tetraethoxysilane
Organic polymer: product of hydrolysis and polycondensation of 3-methacryloxy propyl triethoxysilane (MPTES)
Formulation ratio of tetraethoxysilane and MPTES=1:0.59
Here, 10 g of MPTES, 51 g of ethanol as a solvent and 1.2 g of 0.05N hydrochloric acid were mixed and the mixture was let alone for 19 hours to synthesize the product of hydrolysis and polycondensation of MPTES.
Hybrid Material Q
Metal alkoxide: phenyltriethoxysilane
Organic polymer: product of hydrolysis and polycondensation of MPTES
Formulation ratio of phenyltriethoxysilane and MPTES=1:5.5
The solution of the hybrid material P was applied to the surface of a substrate by a spin coating technique and dried, and then the solution of the hybrid material Q was applied to the resulting coating by a spin coating technique and dried to form two organic-inorganic hybrid material layers of 5 µm in thickness, respectively.

Example 3

Organic-inorganic hybrid material layers were formed in the same way as the above example 2 except for using 3-methacryloxy propyl trimethoxysilane (MPTMS) in place of MPTES in the example 2.

Example 4

Hybrid Material P
Metal alkoxide: tetraethoxysilane (TEOS)
Organic polymer: acrylic resin (PMMA)
Formulation ratio of metal alkoxide solution and organic polymer solution=1:0.64
Hybrid Material Q
Metal alkoxide: zirconium isopropoxide
Organic polymer: acrylic resin (PMMA)
Formulation ratio of metal alkoxide solution and organic polymer solution=1:0.57
Solvent
N-methyl-2-pyrrolidone (NMP)
The solution of the hybrid material P was applied to the surface of a substrate by a spin coating technique and dried, and then the solution of the hybrid material Q was applied to the resulting coating by a spin coating technique and dried to form two organic-inorganic hybrid material layers of 5 µm in thickness, respectively.

Example 5

Hybrid Material P
Metal alkoxide: phenyltriethoxysilane
Organic polymer: acrylic resin (PMMA)
Formulation ratio of metal alkoxide solution and organic polymer solution=1:5.1
Hybrid Material Q
Metal alkoxide: phenyltriethoxysilane
Organic polymer: polystyrene (PS)
Formulation ratio of metal alkoxide solution and organic polymer solution=1:5.3
Solvent
N-methyl-2-pyrrolidone (NMP)
The solution of the hybrid material P was applied to the surface of a substrate by a spin coating technique and dried, and then the solution of the hybrid material Q was applied to the resulting coating by a spin coating technique and dried to form two organic-inorganic hybrid material layers of 5 µm in thickness, respectively.
Evaluation of Adhesion Between Organic-Inorganic Hybrid Material Layers
Using an optical microscope, adhesion between organic-inorganic hybrid material layers was evaluated with respect to the samples of the above examples 1 to 5 and comparative example 1. In the examples 1 to 5, delamination was not observed between the organic-inorganic hybrid material layers in ten samples. On the contrary, in the comparative examples 1, delamination was observed between the organic-inorganic hybrid material layers in four samples of ten samples.

Examples 6 to 9

Hereinafter, an example of an optical waveguide according to the second aspect of the present invention will be described.

Figure 3:
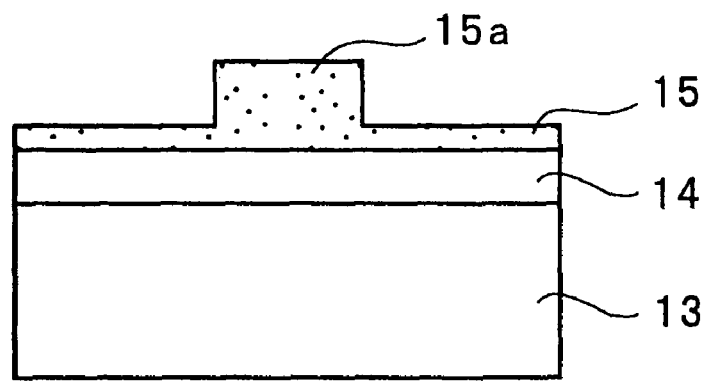
FIG. 3 is a sectional view showing an example of an optical waveguide according to the second aspect of the present invention.
Figure 4:
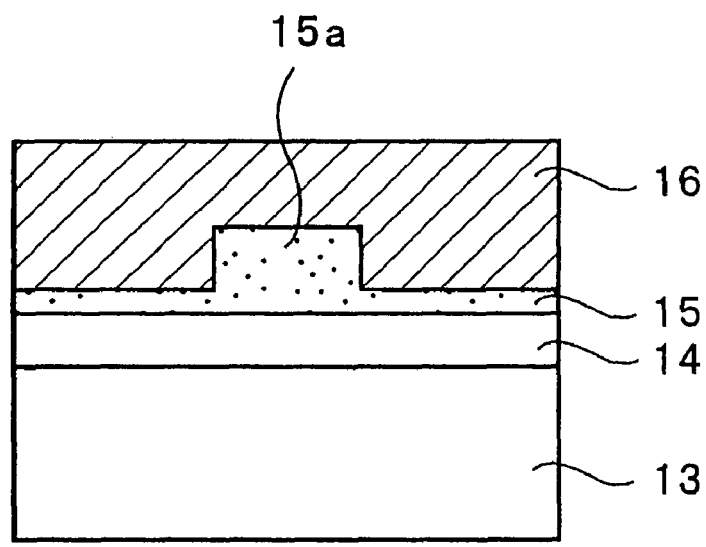
FIG. 4 is a sectional view showing an example of an optical waveguide according to the second aspect of the present invention.

FIGS. 3 and 4 are sectional views showing the optical waveguide according to the second aspect of the present invention.

In the optical waveguide shown in FIG. 3, a lower clad layer 14 is provided on a substrate 13 and an organic-inorganic hybrid material layer 15 is provided on the lower clad layer 14. In the organic-inorganic hybrid material layer 15, a core layer 15a is formed by thickening a central portion. The core layer 15a has a width of about 90 µm and a height of about 50 µm above the lower clad layer 14. Further, the organic-inorganic hybrid material layer 15 of a portion other than the core layer 15a has a thickness of about 5 µm.

Figure 5:
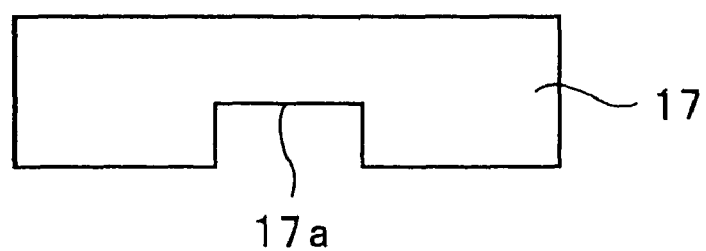
FIG. 5 is a sectional view showing a mold for forming a core layer in an organic-inorganic hybrid material layer.

The core layer 15a may be formed by forming the organic-inorganic hybrid material layer 15, which is softened by heating, on the lower clad layer 14, and then heating and softening the organic-inorganic hybrid material layer 15, and pressing a mold 17 shown in FIG. 5 against the organic-inorganic hybrid material layer 15 with the organic-inorganic hybrid material layer heated and softened. The mold 17 has been provided with a recessed portion 17a having a configuration corresponding to the core layer 15a and the core layer 15a is formed in a shape corresponding to the recessed portion 17a.

In the optical waveguide shown in FIG. 3, an upper clad layer is not provided on the core layer 15a. In this optical waveguide, air acts as the upper clad layer.

In the optical waveguide shown in FIG. 4, the upper clad layer 16 is provided on the organic-inorganic hybrid material layer 15 including the core layer 15a. When the upper clad layer 16 is formed from the organic-inorganic hybrid material, it is preferably formed by using such a solvent as not to dissolve the organic-inorganic hybrid material layer 15 which is a substratum layer. For example, when the organic polymer of the organic-inorganic hybrid material layer 15 is PMMA, a part of the organic-inorganic hybrid material layer 15 is dissolve if NMP is used as the solvent of the upper clad layer 16. Therefore, the upper clad layer 16 is preferably formed from an organic-inorganic hybrid material using a material such as MPTES, which dissolves in alcohol, as the organic polymer.

Further, the organic-inorganic hybrid material using MPTES or the like as the organic polymer is dissoluble to alcohol to be used as the solvent and it is resistant to dissolve in the solvent like NMP. Therefore, the material of the organic polymer of the organic-inorganic hybrid material layer 15 may use the material to dissolve in alcohol and the upper clad layer 16 may be composed of an organic-inorganic hybrid material using PMMA or the like, which dissolves in a solvent like NMP, as the organic polymer.

In the following examples, a silicon substrate was used as a substrate 13.

Example 6

A lower clad layer 14 (with a thickness of about 5 µm) was formed on the substrate 13 using the hybrid material Q of the example 2. Thereon, an organic-inorganic hybrid material layer 15 (with a thickness of about 50 µm) was formed using the hybrid material Q of the example 1. After the organic-inorganic hybrid material layer 15 was formed, it was softened by reheating the coating to a temperature of 150° C., and cooled in a condition of pressing a glass mold 17 shown in FIG. 5 against the softened organic-inorganic hybrid material layer 15. Then, the glass mold 17 was removed and the organic-inorganic hybrid material layer 15, in which a core layer 15a is formed, was obtained.

In addition, in the hybrid material Q of the example 1, which composes the organic-inorganic hybrid material layer 15, phenyltriethoxysilane is used as the metal alkoxide and PMMA is used as the organic polymer. Further, in the hybrid material Q of the example 2, which composes the lower clad layer 14, phenyltriethoxysilane is used as the metal alkoxide and MPTES is used as the organic polymer. Accordingly, in the lower clad layer 14 and the organic-inorganic hybrid material layer 15 in this example, the metal alkoxide (phenyltriethoxysilane) is used as a common material.

Examples 7

A lower clad layer 14 was prepared in the same way as the example 6 except for forming the lower clad layer 14 from silicon oxides in the example 6. The lower clad layer 14 was formed by thermally oxidizing the surface of the substrate 13. Further, in this example, the lower clad layer 14 had a thickness of 0.5 μm.

Examples 8

The optical waveguide shown in FIG. 4 was prepared. After the core layer 15a was formed in the same way as the example 6, an upper clad layer 16 was formed on the core layer 15a. The upper clad layer 16 was prepared using the hybrid material Q of the example 2 as is the case with the lower clad layer 14 in the example 6. And, the thickness of the upper clad layer 16 above the core layer 15a was set at 10 μm. Here, the upper clad layer 16 was formed by being cured with light irradiation. Specifically, by heating the solution of the hybrid material Q of the example 2 at 95° C. for 40 minutes, ethanol being a solvent was removed from the solution and the viscosity of the solution was increased. After the viscous solution was applied to the core layer 15, the solution was cured by irradiating ultraviolet rays with an ultraviolet lamp of 150 W.

Example 9

The optical waveguide shown in FIG. 4 was prepared. In the example 7, after the core layer 15a was formed, an upper clad layer 16 was formed on the core layer 15a. The upper clad layer 16 was prepared using the hybrid material Q of the example 2 as is the case with the example 8. And, the thickness of the upper clad layer 16 was set at the same thickness as the example 8.
Evaluation of Optical Propagation Properties of Optical Waveguide Optical propagation properties was evaluated with respect to the optical waveguides obtained in the examples 6 to 9, using an apparatus shown in FIG. 6. In the apparatus shown in FIG. 6, an optical fiber 21 is connected to one end face of the optical waveguide 22, and laser light 20 with a wavelength of 650 nm enters the optical fiber 21. The other end face of the optical waveguide 22 is provided with an optical system 23 and a screen 24.

As a result of checking optical propagation properties using the optical waveguide of the examples 6 to 9 as an optical waveguide 22, a sharp optical spot could be identified on the screen 24. Accordingly, it was verified that the optical waveguides of the examples 6 to 9 worked as an optical waveguide.

Examples 10 to 15

Hereinafter, an example of an optical waveguide according to the first aspect of the present invention will be described.

FIGS. 7 to 12 are sectional views showing optical waveguides according to the first aspect of the present invention.

Figure 7:
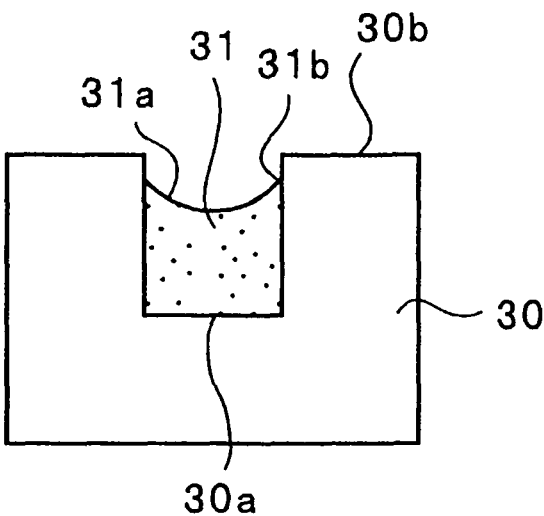
FIG. 7 is a sectional view showing an example of an optical waveguide according to the first aspect of the present invention.

In the example shown in FIG. 7, there is used a substrate 30 in which a groove 30a is formed. The groove 30a has a width of about 90 μm and a depth of 50 μm. A core 31 is formed in the groove 30a of the substrate 30. The core 31 is formed in such a way that the top face 31a thereof is at a lower level than the top face 30b of the substrate 30. The distance in the direction of the height between the highest position 31b in the top face 31a of the core 31 and the top face 30b of the substrate 30 is about 20 μm. The core 31 is formed by impregnating a solution for forming the core into the groove 30a and then solidifying the solution by a method of drying or the like, and the solution for forming the core is shrunk and solidified in the groove 30a through drying to be formed.

In the example shown in FIG. 7, an upper clad layer is not provided and air is the upper clad layer.

Figure 8:
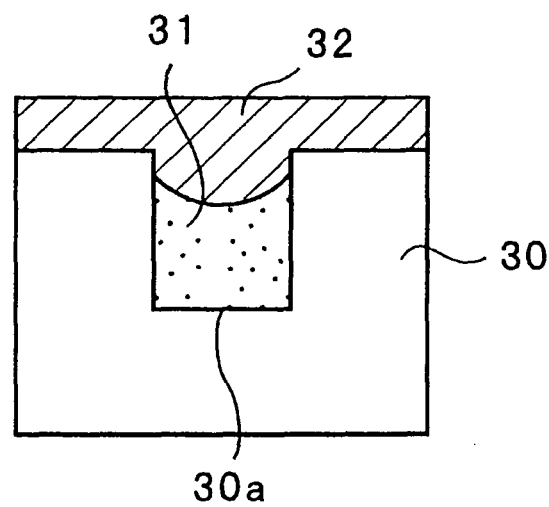
FIG. 8 is a sectional view showing an example of an optical waveguide according to the first aspect of the present invention.

In the example shown in FIG. 8, the upper clad layer 32 is formed on the core 31. The upper clad layer 32 is formed so as to cover the overall substrate 30. The upper clad layer 32 is also formed with the clad layer penetrating into the groove 30a. The thickness of the upper clad layer 32 above the substrate 30 is about 10 μm.

Figure 9:
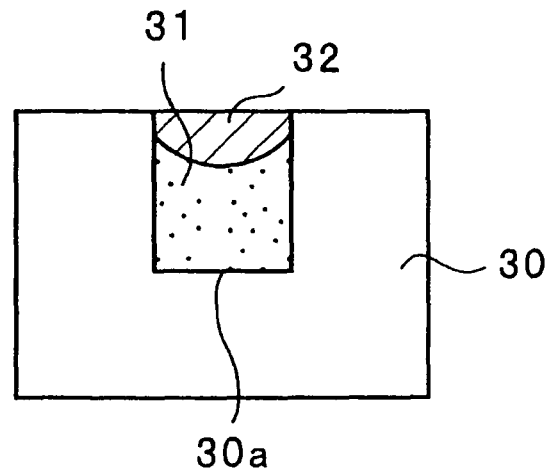
FIG. 9 is a sectional view showing an example of an optical waveguide according to the first aspect of the present invention.

In the example shown in FIG. 9, the upper clad layer 32 is formed on the core 31, but the upper clad layer 32 is formed only within the groove 30a. For example, like an example shown in FIG. 8, such an upper clad layer 32 can be formed by eliminating the upper clad layer 32 above the substrate with lapping or the like after forming the upper clad layer 32 all over the substrate 30. The upper clad layer 32 has a thickness of about 20 μm at the thickest portion.

Figure 10:
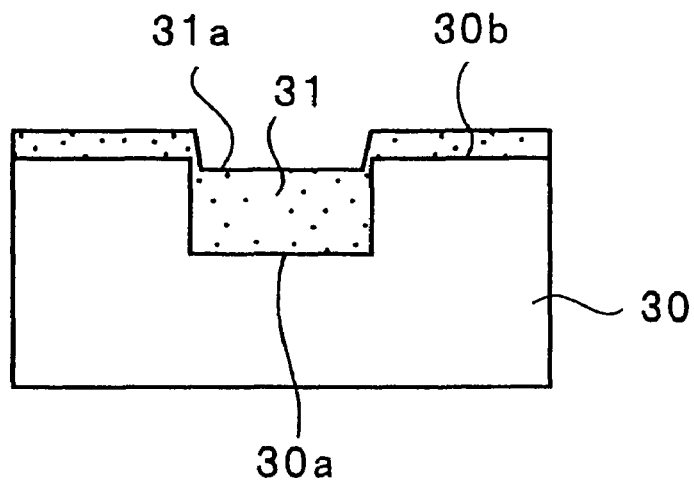
FIG. 10 is a sectional view showing an example of an optical waveguide according to the first aspect of the present invention.

In the example shown in FIG. 10, the core 31 is also formed not only in the groove 30a but also on the top surface 30b of the substrate 30 around the groove 30a. Such a core 31 may be formed by applying the material for forming the core to the whole top surface of the substrate 30 and then drying the material. Further, the top face 31a of the core 31 within the groove 30a is formed so as to be at a lower level than the top face 30b of the substrate 30. The distance in the direction of the height between the top face 31a of the core 31, being in the groove 30a and the top face 30b of the substrate 30 is about 5 μm. In the example shown in FIG. 10, the geometry of the groove 30a is similar to that of the groove 30a in FIG. 7.

In the example shown in FIG. 10, an upper clad layer is not provided on the core 31 and air is the upper clad layer.

Figure 11:
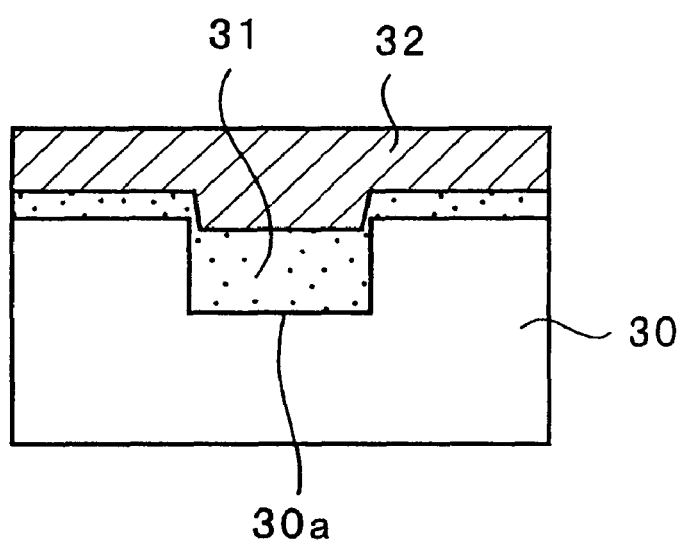
FIG. 11 is a sectional view showing an example of an optical waveguide according to the first aspect of the present invention.

In the example shown in FIG. 11, the upper clad layer 32 is formed on the core 31 in the condition illustrated in FIG. 10. The thickness of the upper clad layer 32 around the groove 30a is about 20 μm.

Figure 12:
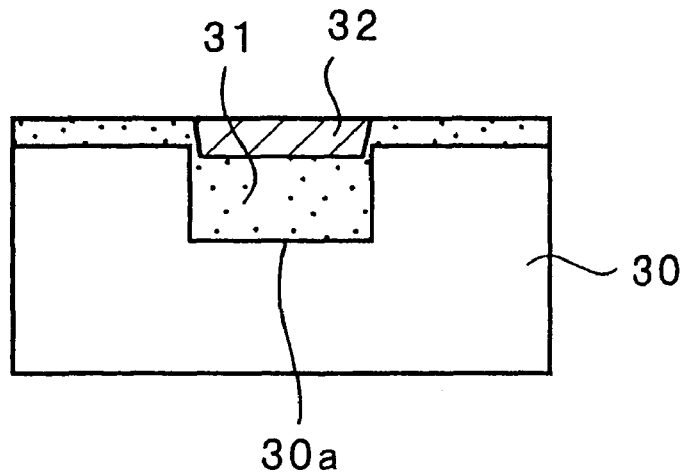
FIG. 12 is a sectional view showing an example of an optical waveguide according to the first aspect of the present invention.

In the example shown in FIG. 12, the upper clad layer 32 is provided only on the core 31 within the groove 30a. Such an upper clad layer 32 can be formed by eliminating the upper clad layer 32 above the core 31 at the circumference of the groove 30a with lapping or the like in the condition illustrated in FIG. 11. The upper clad layer has a thickness of about 10 μm In the following examples 10 to 15, the following materials were used as the materials of a substrate, a core, and an upper clad.
Material of Substrate
Quartz Glass The substrate was prepared by using quartz glass as the material of the substrate and forming a groove with a specified configuration on the quartz glass substrate by photolithography and etching with hydrofluoric acid.

In addition, in the present invention, the substrate can also be formed from TEMPAX, Pyrex®, and white sheet glass in place of quartz glass.

Resin

An acrylic resin (PMMA) was formed using a mold, and the substrate having a groove with a specified shape was prepared.

In the present invention, the similar substrate may be prepared by using a thermoplastic resin such as polystyrene or polycarbonate in place of the acrylic resin.

Organic-Inorganic Hybrid Material

The solution of the hybrid material P of the example 1 was applied to the surface of a substrate composed of another material and dried, and then the applied coating was softened by reheating the coating to a temperature of 150° C. By pressing a metallic mold against the softened coating, the substrate having a groove with a specified shape was prepared.

Material of Core

Resin

An acrylic ultraviolet curable resin was used.

In the present invention, a thermosetting resin may be used in place of the ultraviolet curable resin.

Organic-Inorganic Hybrid Material

The core layer was prepared using the hybrid material Q of the example 2.

Material of Upper Clad

Resin

The upper clad was formed using the acrylic ultraviolet curable resin.

In the present invention, the thermosetting resin may be used in place of the ultraviolet curable resin.

Organic-Inorganic Hybrid Material

An upper clad was formed using the hybrid material P of the example 2.

Incidentally, the refractive indexes of the respective materials of the substrate, the core and the clad are generally as follows.

Quartz glass: 1.46
Acrylic resin (PMMA): 1.49
Acrylic ultraviolet curable resin (for a core): 1.52
Acrylic ultraviolet curable resin (for a clad): 1.48
Organic-inorganic hybrid material consisting of hybrid material P of example 1: 1.47
Organic-inorganic hybrid material consisting of hybrid material P of example 2: 1.46
Organic-inorganic hybrid material consisting of hybrid material Q of example 2: 1.50

Examples 10

The optical waveguide having a configuration shown in FIG. 7 was prepared. Quartz glass was used as the material of the substrate 30 and the organic-inorganic hybrid material was used as the material of the core 31. Here, the upper clad layer was not provided and air became the upper clad.

Examples 11

The optical waveguide having a configuration shown in FIG. 8 was prepared. Resin was used as the material of the substrate 30 and the organic-inorganic hybrid materials were used as the materials of the core 31 and the upper clad 32.

Examples 12

The optical waveguide having a configuration shown in FIG. 8 was prepared. The organic-inorganic hybrid materials were used as the materials of the substrate 30, the core 31 and the upper clad 32, respectively.

Examples 13

The optical waveguide having a configuration shown in FIG. 11 was prepared. Quartz glass was used as the material of the substrate 30. The organic-inorganic hybrid materials were used as the materials of the core 31 and the upper clad 32, respectively.

Examples 14

The optical waveguide having a configuration shown in FIG. 12 was prepared. Resins were used as the material of the substrate 30 and the core 31, respectively. The organic-inorganic hybrid material was used as the materials of the upper clad 32.

Examples 15

The optical waveguide having a configuration shown in FIG. 11 was prepared. The organic-inorganic hybrid materials were used as the materials of the substrate 30, the core 31 and the upper clad 32, respectively.

Evaluation of Optical Propagation Properties of Optical Waveguide

Figure 6:
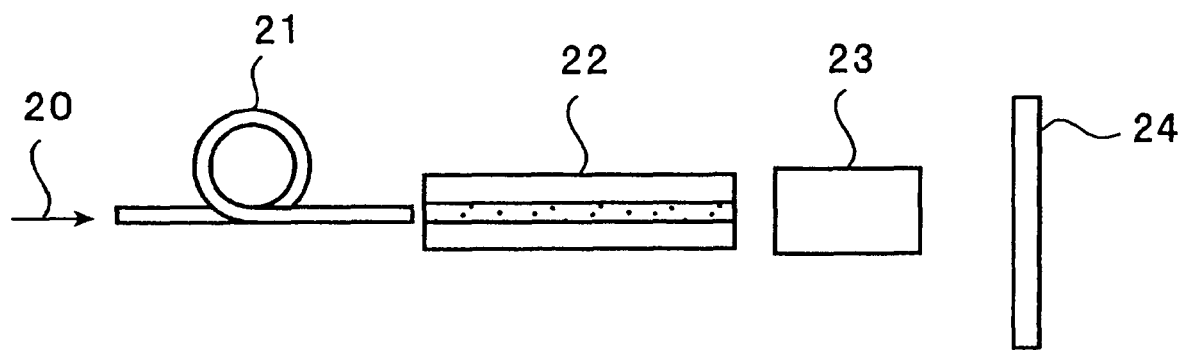
FIG. 6 is a schematic diagram showing an apparatus for evaluating optical propagation properties of the optical waveguide.

Optical propagation properties were evaluated with respect to the optical waveguides of the examples 10 to 15, using an apparatus shown in FIG. 6. A sharp optical spot could be identified on a screen, and therefore it was verified that these optical waveguides worked as an optical waveguide.

Comparative Example 2

Figure 16:
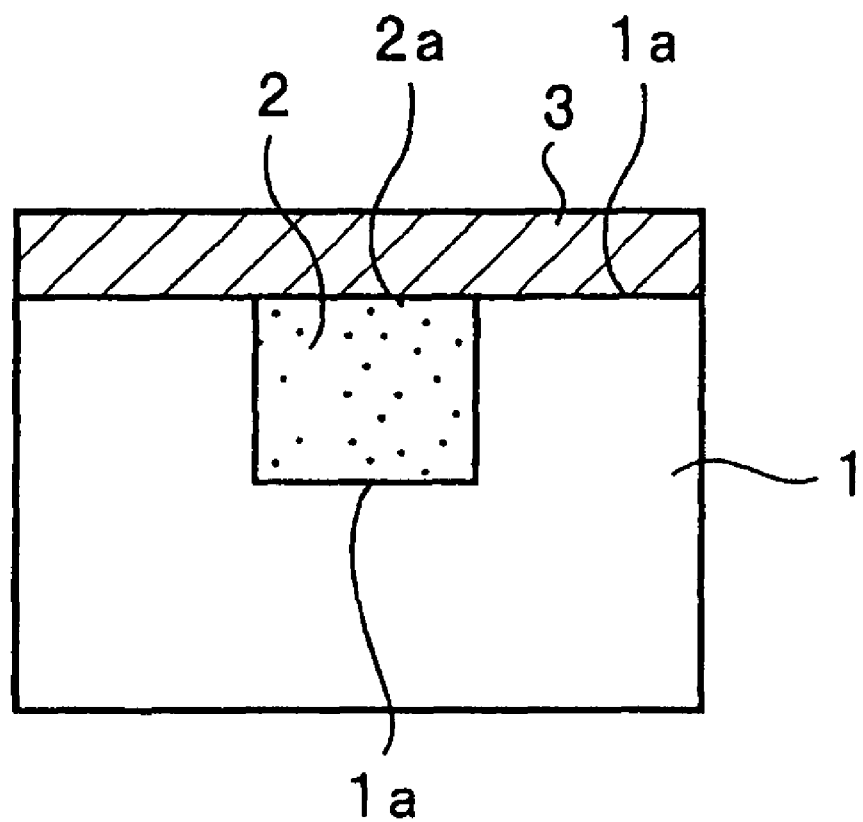
FIG. 16 is a sectional view showing a structure of an optical waveguide of the comparative example.

The optical waveguide of the examples 2 having a structure shown in FIG. 16 was prepared. This optical waveguide is an optical waveguide prepared by a conventional fabrication process shown in FIG. 15. The geometry of a groove 1a of a substrate 1 is similar to that of the examples 10 to 15. The top face 2a of a core 2 within the groove 1a is formed so as to be at about the same level as the top face 1a of the substrate 1. Therefore, the distance in the direction of the height between the top face 2a of the core 2 and the top face 1a of the substrate 1 is 0 μm. And, an upper clad 3 has a thickness of 20 μm.

Since this optical waveguide is one prepared by a fabrication process shown in FIG. 15, the top surface 2a of the core 2 is smoothed by buffing.

Evaluation of Scattering of Guided Light

Figure 13:
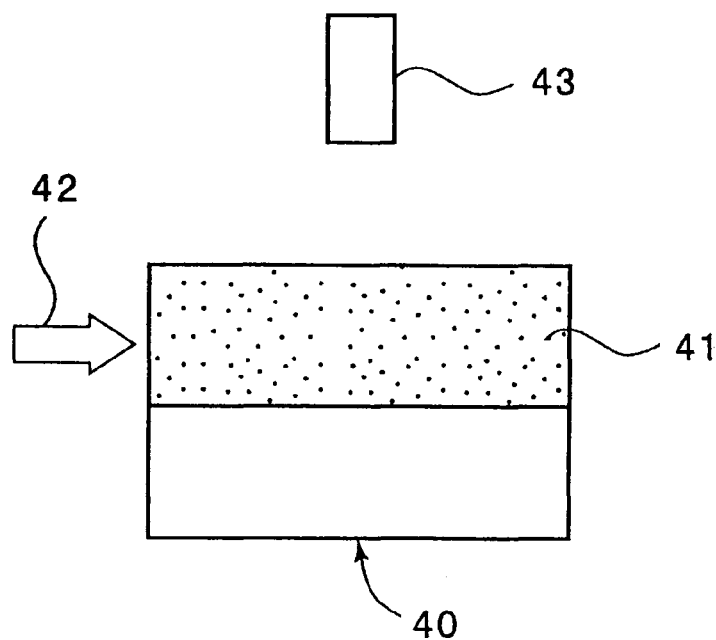
FIG. 13 is a schematic diagram showing an apparatus for evaluating scattering of guided light.

Scattering of the guided light was evaluated with respect to the optical waveguides of the examples 10 to 15 and the comparative example 2, using an apparatus shown in FIG. 13.

As shown in FIG. 13, laser light 42 with a wavelength of 650 nm was irradiated to a side face of a core portion of a laminated layer 41 consisting of the core and the clad of the optical waveguide 40 and light leaked from the top face of the core was observed with a CCD camera 43. Consequently, light was seen with the CCD camera 43 in the comparative example 2, and it was observed that the guided light scattered in the core and light was leaked from the top face of the core. It was thought that because the top face of the core in the comparative example 2 is roughened by buffing, the guided light was scattered.

On the contrary, such a scattering of the guided light was not found in the optical waveguides of the examples 10 to 15.

Evaluation of Occurrence of Cracks of Upper Clad

The occurrence of the cracks of the upper clad was evaluated with respect to the optical waveguides of the examples 11 to 15 and the comparative example 2. Number of cracks generated within 40 μm square area in the upper clad was measured with an optical microscope. Consequently, while the occurrence of the cracks was not found in the examples 11 to 15, five cracks were found to be generated in the comparative example 2.

Example 16

Figure 14:
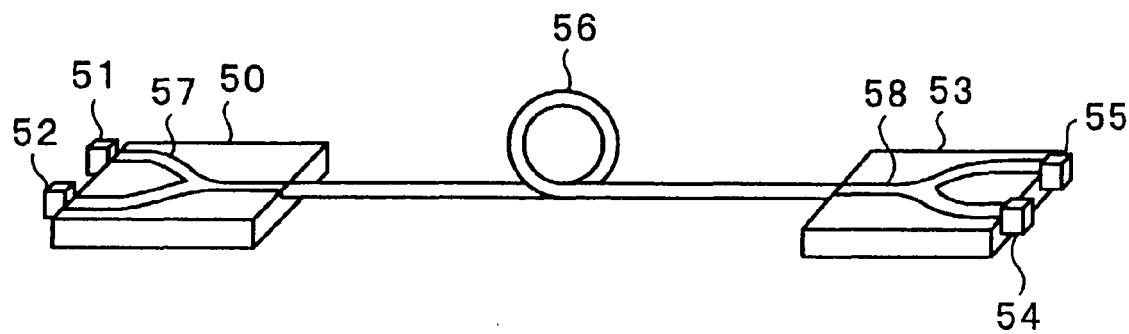
FIG. 14 is a perspective view showing an optical transmitter and receiver module of the present invention.

An optical transmitter and receiver module was prepared using the optical waveguide of the example 15. FIG. 14 is a perspective view showing an optical transmission system using this optical transmitter and receiver module. Optical sending and receiving modules 50 and 53 are connected to both ends of an optical fiber 56, respectively. In the optical transmitter and receiver modules 50 and 53, there is provided Y branch optical waveguides 57 and 58, respectively, which are formed from the optical waveguide of the example 11. The end portions of the optical fiber 56 are connected to the tips of the Y branch optical waveguides 57 and 58, respectively, and a laser diode 51 and a photo diode 52, and a laser diode 54 and a photo diode 55 are connected to branched ends of the Y branch optical waveguides 57 and 58, respectively. As the optical fiber 56, there was used a multimode optical fiber made from glass, having a core diameter of 50 μm.

When a pulse of light, having a frequency of 100 kHz, was entered from the laser diode 51 of the optical transmitter and receiver module 50, the pulse of light could be reproduced from the photo diode 55 of the optical transmitter and receiver module 53. Accordingly, it was verified that this optical transmitter and receiver module worked as an optical transmitter and receiver module.

Examples 17 and 18

Hereinafter, there will be described an example in which an organic-inorganic hybrid material is formed from two kinds of metal alkoxides.

Example 17

The laminated structure shown in FIG. 1 was formed. A silicon substrate was used as a substrate 10, and an organic-inorganic hybrid material layer 11 was formed from the hybrid material P and an organic-inorganic hybrid material layer 12 was formed from the hybrid material Q.

Hybrid Material P
First metal alkoxide: 3-methacryloxy propyl triethoxysilane (MPTES)
Second metal alkoxide: tetraethoxysilane (TEOS)
13.2 g of MPTES, 16.8 g of ethanol, 1.6 g of hydrochloric acid (2N) and 2.4 g of TEOS were mixed and the mixture was let alone at 30° C. for 45 hours. This mixed solution was used as the solution of the hybrid material P.

Hybrid Material Q
First metal alkoxide: MPTES
Second metal alkoxide: phenyltriethoxysilane (PhTES)
13.2 g of MPTES, 16.8 g of ethanol, 1.6 g of hydrochloric acid (2N) and 2.4 g of PhTES were mixed and the mixture was let alone at 30° C. for 45 hours. This mixed solution was used as the solution of the hybrid material Q.

The solution of the hybrid material P was applied to the surface of a substrate by a spin coating technique and dried, and then the applied coating was heated at 180° C. for 20 minutes in a hot oven. Thereby, MPTES in the hybrid material P was polymerized and the coating was cured. Then, the solution of the hybrid material Q was applied onto the resulting coating by a spin coating technique and dried, and then the applied coating was heated at 180° C. for 20 minutes in the hot oven. Thereby, MPTES in the hybrid material Q was polymerized and the coating was cured. Each coating had a thickness of 5 μm.

Example 18

Organic-inorganic hybrid material layers in which two layers were laminated on a substrate were formed in the same way as the above example 17 except for using 3-methacryloxypropyl trimethoxysilane (MPTMS) in place of MPTES of the hybrid material P and the hybrid material Q in the example 17. Here, the amount of MPTMS used was 13.2 g.

Evaluation of Adhesion Between Organic-Inorganic Hybrid Material Layers

Using an optical microscope, adhesion between organic-inorganic hybrid material layers was evaluated with respect to the samples of the above examples 17 and 18. In the examples 17 and 18, delamination was not observed between the organic-inorganic hybrid material layers in any ten samples, respectively. It is thought that the delamination did not occur in the examples 17 and 18 because MPTES was commonly used between the organic-inorganic hybrid material layers in the examples 17 and MPTMS was commonly used between the organic-inorganic hybrid material layers in the examples 18.

Examples 19 to 21

Example 19

A lower clad layer 14 (with a thickness of about 5 μm) was formed on a substrate 13 using the hybrid material P of the example 17 in the same way as the example 6. Here, the lower clad layer 14 was heated at 180° C. for 20 minutes in a hot oven to be cured.

By heating the solution of the hybrid material Q of the example 17 at 95° C. for 40 minutes, ethanol being a solvent was removed from the solution and the viscosity of the solution was enhanced. The viscous solution was dropped onto the lower clad layer 14 and heated at 180° C. for 20 minutes in the hot oven while pressing a glass mold 17 illustrated in FIG. 5 against the solution on the lower clad layer 14 to be cured. After curing, the glass mold 17 was removed and a core layer 15a was formed on an organic-inorganic hybrid material layer 15.

Example 20

An organic-inorganic hybrid material layer 15 was formed in the same way as the example 19 except for forming the lower clad layer 14 from silicon oxides in the example 19. Further, the lower clad layer 14 was formed by thermally oxidizing the surface of a substrate 13. The lower clad layer 14 had a thickness of 0.5 μm.

Example 21

The optical waveguide shown in FIG. 4 was prepared. After the core layer 15a was formed in the same way as the example 19, an upper clad layer 16 was formed on the core layer 15a. The upper clad layer 16 was prepared using the hybrid material P of the example 17 as is the case with the lower clad layer 14 in the example 19. The thickness of the upper clad layer 16 above the core layer 15a was set at 10 μm. Here, the upper clad layer 16 was cured by heating the solution of the hybrid material P at 95° C. for 40 minutes to remove ethanol from the solution and to make the solution highly viscous, and then applying the viscous solution to the core layer 15, and by irradiating ultraviolet rays with an ultraviolet lamp of 150 W.

Evaluation of Optical Propagation Properties of Optical Waveguide

Optical propagation properties were evaluated with respect to the optical waveguides obtained in the examples 19 to 21, using an apparatus shown in FIG. 6. Consequently, it was verified that the optical waveguides of the examples 19 to 21 worked as an optical waveguide.

Example 22

Using the solution of the hybrid material Q in the example 17, an organic-inorganic hybrid material layer was formed on the silicon substrate. By heating the solution of the hybrid material P at 95° C. for 40 minutes, ethanol was removed from the solution and the solution of high viscosity was obtained. This solution was applied onto the substrate and the resulting coating was cured by irradiating ultraviolet rays with an ultraviolet lamp of 150 W. The coating was formed so as to have a film thickness of 5 μm.

Figure 17:
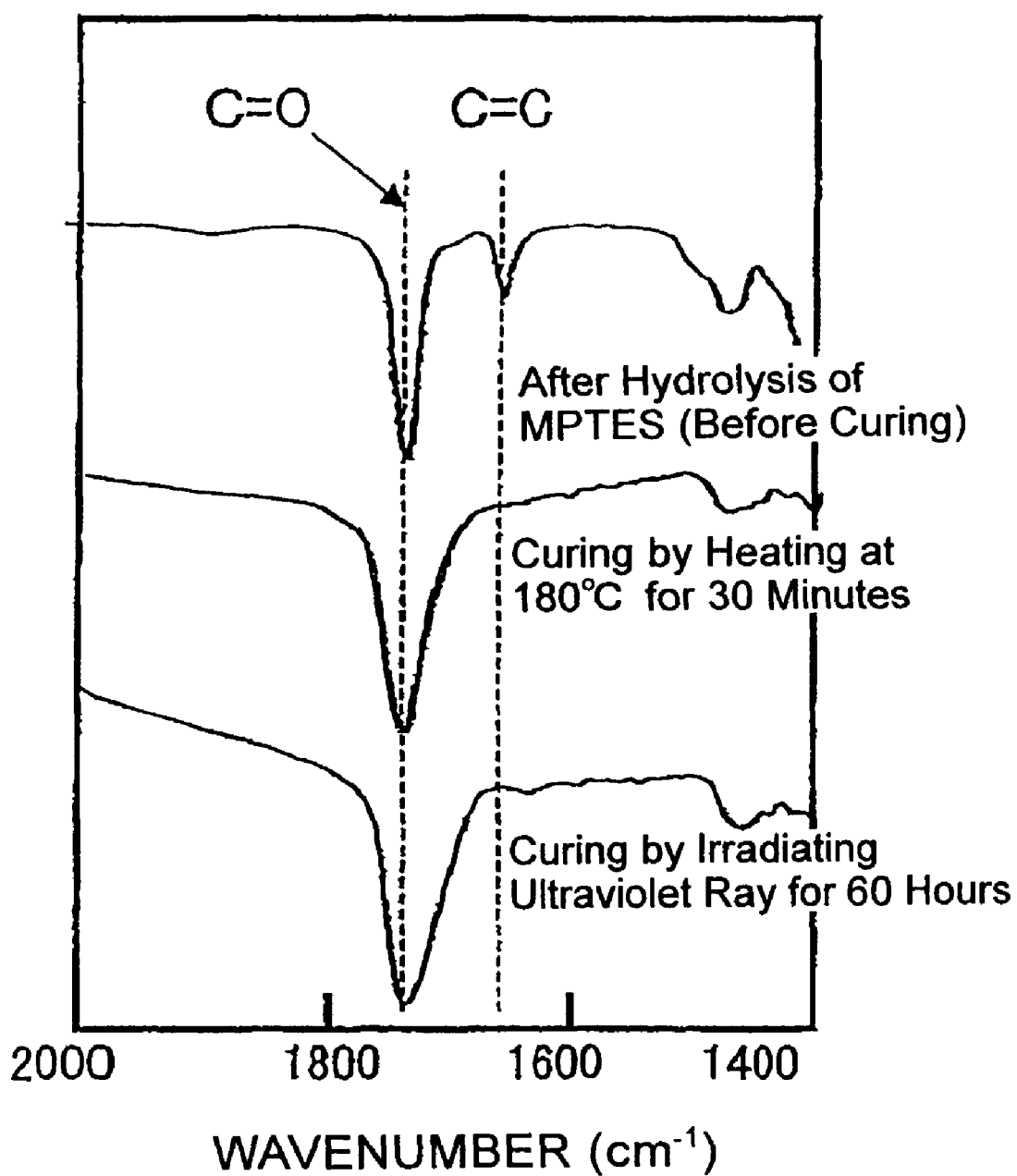
FIG. 17 is a view showing an absorption peak resulting from a C=C bond in the neighborhood of 1650 cm$^{-1}$ and an absorption peak resulting from a C=O bond in the neighborhood of 1750 cm$^{-1}$ in infrared absorption spectrum.

FIG. 17 is a view showing infrared absorption spectrum of the hybrid material P. In FIG. 17, there are shown the peak, respectively, at the times before curing after hydrolyzing MPTES, when the hybrid material P was cured by heating at 180° C. for 20 minutes and when the hybrid material P was cured by being irradiated for 30 minutes with ultraviolet rays.

It is apparent from FIG. 17 that the height of the absorption peak resulting from a C=C bond in the neighborhood of 1650 cm$^{-1}$ is reduced through curing MPTES with heat or ultraviolet rays.

Table 1 shows a relationship between a ratio of peak intensity and hardness in a case of changing a degree of curing of coatings by changing an irradiation time. The ratio of peak intensity is (height of the absorption peak resulting from a C=C bond in the neighborhood of 1650 cm$^{-1}$)/(height of the absorption peak resulting from a C=O bond in the neighborhood of 1750 cm$^{-1}$) in infrared absorption spectrum. Hardness was measured with a Vickers hardness tester.

Here, with respect to hardness, hardness in a case where a material was sufficiently cured was regarded as 1.0 and measurements were normalized.

TABLE 1

| | Ratio of Peak Intensity | | | |
|---|---|---|---|---|
| | 0.05 | 0.1 | 0.2 | 0.3 |
| Hardness | 1.0 | 1.0 | 0.8 | Shortage of Curing |

It is apparent from Table 1 that when the ratio of the peak intensity is 0.1 or less, the hardness of the coating becomes sufficient.

Example 23

PMMA is commonly contained in the hybrid material P and the hybrid material Q of the example 1. The hybrid material Q contains about 20% by weight of PMMA and the hybrid material P contains about 36% by weight of PMMA.

The organic-inorganic hybrid material layers were prepared in the same way as the example 1 except that the PMMA content in the hybrid material P was varied as shown in Table 2, and adhesion between organic-inorganic hybrid material layers was evaluated. Measurements are shown in Table 2.

TABLE 2

| | PMMA Content in Hybrid Material P (% by weight) | | | | | | | |
|---|---|---|---|---|---|---|---|---|
| | 0 | 1 | 3 | 5 | 10 | 20 | 50 | 100 |
| Number of Delaminations Occurred in 10 Samples | 4 | 4 | 2 | 0 | 0 | 0 | 0 | 0 |

It is apparent from the measurements in Table 2 that there is an effect of improving the adhesion when the PMMA content in the hybrid material P is 3% by weight or more, and there is an effect of improving further the adhesion when the PMMA content in the hybrid material P is 5% by weight or more.

From the facts describe above, it is understood that when the same component is commonly contained in the two contacting layers of the organic-inorganic hybrid material, the adhesion between the two contacting layers is enhanced.

Examples 24 and 25, and Comparative Examples 3 and 4 Example 24

The optical waveguide having a structure shown in FIG. 4 was prepared. A silicon substrate was used as the substrate 13. The lower clad layer 14 and the upper clad 16 were prepared using the solution of the hybrid material Q in the example 17. The organic-inorganic hybrid material layer 15 was prepared using the solution of the hybrid material Q of the example 1. Therefore, in this example, the upper clad layer 16, the organic-inorganic hybrid material layer 15 (core layer 15a) and the lower clad layer 14 are formed from the following materials.

Upper clad layer 16: MPTES and PhTES in combination
Organic-inorganic hybrid material layer 15: PMMA and PhTMS in combination
Lower clad layer 14: MPTES and PhTES in combination The lower clad layer 14 was cured by heating at 180° C. for 20 minutes after applying the solution of the hybrid material Q to the substrate. The organic-inorganic hybrid material layer 15 (core layer 15a) was formed in the same way as the example 6. Since when the upper clad layer 16 was cured by being heated, the organic-inorganic hybrid material layer 15, being a substratum layer thereof, became deformed, the upper clad layer 16 was cured by irradiating ultraviolet rays. Specifically, by heating the solution of the hybrid material Q at 95° C. for 40 minutes, ethanol was removed from the solution and the viscosity of the solution was increased. After the viscous solution was applied, the solution was cured by irradiating ultraviolet rays for 0.5 hour using an ultraviolet lamp of 150 W.

Incidentally, each layer of the optical waveguide had a thickness similar to that of the example 8.

Example 25

13.2 g of MPTES, 16.8 g of ethanol, 1.6 g of hydrochloric acid (2N) and 2.4 g of phenyltrimethoxysilane (PhTMS) were mixed and the mixture was let alone at 30° C. for 45 hours. This mixed solution was used as the material for forming the organic-inorganic hybrid material layer 15 (core layer 15a). As the materials for forming the upper clad layer 16 and the lower clad layer 14, there was used the solution similar to that of the example 24. The materials of the respective layers are as follows.

Upper clad layer 16: MPTES and PhTES in combination
Organic-inorganic hybrid material layer 15: MPTES and PhTMS in combination
Lower clad layer 14: MPTES and PhTES in combination By heating the solution for the organic-inorganic hybrid material layer 15 at 95° C. for 40 minutes, ethanol was removed from the solution and the solution with a high viscosity was prepared. By irradiating ultraviolet rays on and curing the solution in a condition of pressing a glass mold 17 illustrated in FIG. 5 against the solution after applying the viscous solution to the lower clad layer 14, the organic-inorganic hybrid material layer 15 was formed. And the upper clad layer 16 was formed in the same way as the example 24.

The thicknesses of the respective layers are similar to the example 24.

Comparative Example 3

An optical waveguide was formed in the same way as the above example 24 except for replacing PMMA in material composing the organic-inorganic hybrid material layer 15 (core layer 15a) with polystyrene (PS) in the example 24. The materials of the respective layers are as follows.

Upper clad layer 16: MPTES and PhTES in combination
Organic-inorganic hybrid material layer 15: PS and PhTMS in combination
Lower clad layer 14: MPTES and PhTES in combination
Comparative example 4

An optical waveguide was formed in the same way as the above example 25 except for replacing MPTES in material composing the organic-inorganic hybrid material layer 15 (core layer 15a) with P-styryltrimethoxysilane (PSTMS) in the example 25. The materials of the respective layers are as follows.

Upper clad layer 16: MPTES and PhTES in combination
Organic-inorganic hybrid material layer 15: PSTMS and PhTMS in combination
Lower clad layer 14: MPTES and PhTES in combination
Evaluation of Adhesion Between Organic-Inorganic Hybrid Material Layers Using an optical microscope, adhesion between organic-inorganic hybrid material layers was evaluated with respect to the samples of the above examples 24 and 25, and comparative examples 3 and 4. In the examples 24 and 25, delamination was not observed in any ten samples, respectively. On the contrary, in the comparative examples 3, delamination was observed in three samples of ten samples. Also, in the comparative examples 4, delamination was observed in two samples of ten samples.

It is conceivable that in the examples 24, excellent adhesion was exhibited because PMMA contained in the organic-inorganic hybrid material layer has an affinity for MPTESs contained in the upper and lower clad layers. Also, it is conceivable that in the examples 25, excellent adhesion was exhibited because MPTES was contained in the respective layers and therefore the affinities between the respective layers were high.

In accordance with the first aspect of the present invention, there is formed the optical waveguide which can reduce propagation losses of light due to propagated light scattering.

In accordance with the second aspect of the present invention, there is formed the optical waveguide having a novel structure which uses the organic-inorganic hybrid material for the core layer.

In accordance with the third aspect of the present invention, there is formed the laminated structure consisting of the organic-inorganic hybrid material, which has high adhesion.

What is claimed is:

1. A laminated structure formed by laminating layers, each of which is formed from an organic-inorganic hybrid material formed from an organic polymer and a metal alkoxide which are not chemically combined with each other, said organic polymer being selected from the group consisting of polymethyl methacrylate, polystyrene, and polyvinyl naphthalene, characterized in that the organic-inorganic hybrid material of one layer is not the same as the organic-inorganic hybrid material of another layer and the same organic polymer is commonly used among the layers of different organic-inorganic hybrid materials in which layers the same metal alkoxide is not used.

2. The laminated structure according to claim 1, characterized in that the layers of different organic-inorganic hybrid materials form an upper layer and a lower layer of the laminated structure, and further characterized in that the organic-inorganic hybrid material composing the upper layer thereof is formed using a raw material of the organic-inorganic hybrid material and/or a solvent, which does not dissolve the organic-inorganic hybrid material composing the lower layer thereof.

3. The laminated structure according to claim 2, characterized in that the organic-inorganic hybrid material composing said upper layer is composed of any one material of the material synthesized using alcohol as a solvent and the material synthesized using N-methyl-2-pyrrolidone as a solvent and the organic-inorganic hybrid material composing said lower layer is composed of the other material of the materials synthesized.

4. The laminated structure according to claim 1, characterized in that said organic-inorganic hybrid material is prepared by a sol-gel process using an organic polymer, metal alkoxide, and a solvent.

5. The laminated structure according to claim 1, characterized in that the organic-inorganic hybrid material of said one layer and/or the organic-inorganic hybrid material of said other layer is formed from a metal alkoxide having a double bond group to be polymerized by light or heat and from a metal alkoxide not having said double bond group.

6. The laminated structure according to claim 1, characterized in that metal alkoxide having a double bond group to be polymerized by light or heat is used as said metal alkoxide.

7. The laminated structure according to claim 6, characterized in that said double bond group is an acryloxy group or a methacryloxy group.

8. The laminated structure according to claim 6, characterized in that the metal alkoxide having said double bond group polymerizes through a reaction of the double bond.

9. The laminated structure according to claim 8, characterized in that said double bond group is an acryloxy group or a methacryloxy group, and the acryloxy group or the methacryloxy group reacts and polymerizes in such a way that the value of (height of the absorption peak resulting from a C=C bond in the neighborhood of $1650\ cm^{-1}$)/(height of the absorption peak resulting from a CO=O bond in the neighborhood of $1750\ cm^{-1}$) is 0.1 or less in infrared absorption spectrum.

10. The laminated structure according to claim 1, characterized in that said metal alkoxide is expressed by $M(OR)_4$, wherein M is metal and R is an alkyl group; $R'W(OR)_3$, wherein M is metal, R is an alkyl group and R' is an alkyl group, an aryl-containing group, an acryloxy-containing group, a methacryloxy-containing group, a styryl-containing group or an epoxy-containing group; or $R'_2M(OR)_2$, wherein M is metal, R is an alkyl group and R' is an alkyl group, an aryl-containing group, an acryloxy-containing group, a methacryloxy-containing group, a styryl-containing group or an epoxy-containing group.

11. The laminated structure according to claim 10, characterized in that said metal alkoxide is any of tetraethoxysilane, tetramethoxysilane, phenyltriethoxysilane, phenyltrimethoxysilane, diphenyldiethoxysilane, diphenyldimethoxysilane, 3-methacryloxy propyl triethoxysilane, 3-methacryloxy propyl trimethoxysilane, 3-methacryloxy propyl methyldimethoxysilane, and 3-acryloxy propyl trimethoxysilane.

12. The laminated structure according to claim 1, characterized in that said metal alkoxide is expressed by $M(OR)_n$, wherein M is metal, R is an alkyl group and n is 2, 3, 4 or 5; $R'M(OR)_{n-1}$, wherein M is metal, R is an alkyl group, R' is an organic group and n is 2, 3, 4 or 5; or $R'_2M(OR)_{n-2}$, wherein M is metal, R is an alkyl group, R' is an organic group and n is 2, 3, 4 or 5.

13. The laminated structure according to claim 12, characterized in that said organic group is an alkyl group, an aryl-containing group, an acryloxy-containing group, a methacryloxy-containing group, a styryl-containing group, or an epoxy-containing group.

14. The laminated structure according to claim 1, characterized in that said laminated structure is formed by laminating organic-inorganic hybrid materials, and a metal alkoxide having a double bond group to be polymerized by light or heat is used in an upper layer of said laminated structure, and the metal alkoxide having said double bond group polymerizes through a reaction of said double bond group by light irradiation.

* * * * *